Nov. 7, 1967 L. GASSER 3,351,715

KEY-CONTROLLED MULTI-FREQUENCY TONE GENERATOR

Filed Aug. 24, 1964 2 Sheets-Sheet 1

United States Patent Office 3,351,715
Patented Nov. 7, 1967

3,351,715
KEY-CONTROLLED MULTI-FREQUENCY TONE GENERATOR

Lorenz Gasser, Gerlingen, Germany, assignor to International Standard Electric Corporation, New York, N.Y., a corporation of Delaware Filed Aug. 24, 1964, Ser. No. 391,486
Claims priority, application Germany, Sept. 14, 1963, St 21,078
5 Claims. (Cl. 179—84)

ABSTRACT OF THE DISCLOSURE

A key-controlled multi-frequency tone generator comprising an oscillator circuit, said oscillator circuit comprising at least a first and a second tank circuit, each of said tank circuits providing one of said frequencies of the multi-frequency tone, said tank circuits comprising parallel connected multi-tapped windings, a single capacitor in each of said tank circuits, means for permanently connecting said capacitor to the windings in the same tank circuit, series contact chain in each of said tank circuits for connecting said capacitors to desired tappings of the multi-tapped windings.

Figure 1:
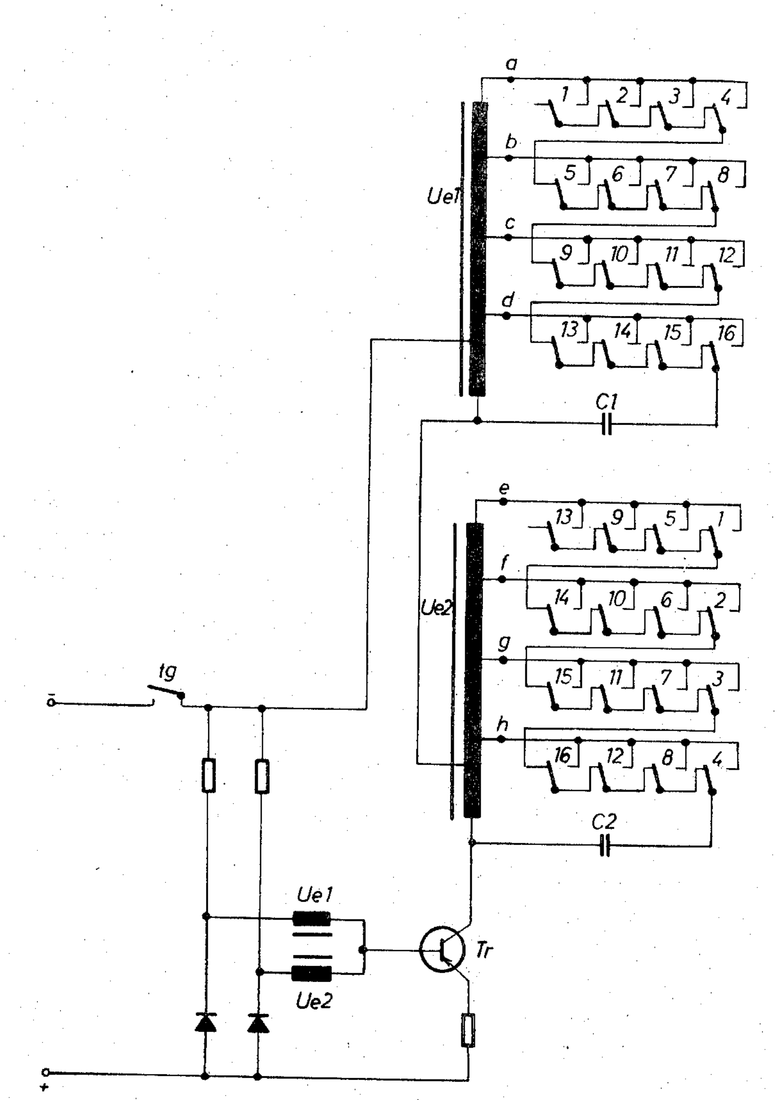

The invention relates in general to tone signalling and more particularly to a key-controlled multi-frequency tone generator in which several oscillating circuits are simultaneously set through key-contacts.

Such generators are used for example in the subscriber stations of telephone systems using voice-frequency code signalling. All signals emitted from said station show a determined number of signal frequencies. The signals may be represented, for example, in the 2-out-of-5 code or in the 2 x 1-out-of-4 code. Thus, two signal frequencies must always be emitted simultaneously when one signal is transmitted. The multi-frequency tone generator therefore has two oscillating circuits which are simultaneously set, when pressing a single key, through the contacts of said key.

In most cases a capacitor per oscillating circuit is connected via make-contacts of the key to corresponding tappings of the osillating circuit winding. Thus, several signal frequencies can be formed via said oscillating circuit. This connection of the oscillating-circuit capacitor, however, is different in that with the simultaneous operation of two and more keys, parts of the oscillating-circuit windings are short-circuited. Thereby a faulty signal can be emitted. For example, only one frequency would be transmitted. Such a fault is particularly troublesome, if the keys are operated while a connection exists.

In single frequency-signal-transmission undesired switching or selecting paths could be released in the establishment of the connection.

The object of the invention is to create a key-controlled multi-frequency tone generator in which the unintended operation of two or more keys does not produce a single frequency signal. The key-controlled multi-frequency tone generator according to the invention, in which several oscillating circuits are simultaneously set through key contacts, is characterised in this that the tuning contacts of an oscillating circuit are designed as change-over contacts. The series-connected break-contact sides are connected to the capacitor of the oscillating circuit, and the make-contact sides are connected to the tappings of the oscillating circuit inductive winding. The oscillator is tuned to the desired frequency by coupling the appropriate tap to the capacitor.

The change-over contacts assure that the oscillating-circuit capacitor is always connected with one tapping of the oscillating-circuit inductors regardless of how many keys are operated. The key contact arrangement can be made, according to the invention, in that one key is equipped with a change-over contact for each switching-over chain, i.e. for each oscillating-circuit. Another alternative is that a key operates on a coordinate lever system and, only one contact of each switch-over chain is operated. Emission of signals is still improved in that a common contact is closed when operating any arbitrary key that contact connects the multi-frequency tone generator with the supply voltage common contact is operated only when the change-over contacts of the operated key have tuned the oscillating circuits. Thereby switching differences between the individual oscillating circuit contacts can be matched. It is of advantage furthermore, when all oscillating circuits are excited only by one active element and the change-over contacts of the chains are designed thus that the transition from the break to the make side is performed within a negligible time as it is the case with snap-type keys, for example.

Figure 2:
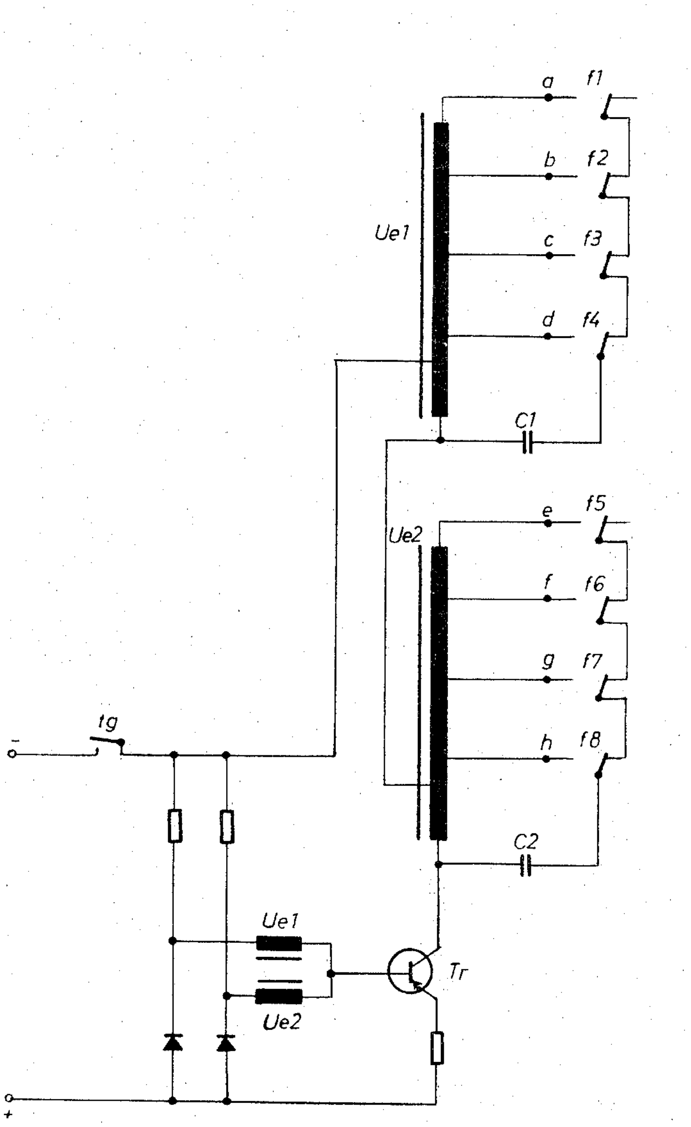

The invention is now in detail explained with the aid of examples, as shown in the accompanying drawings, wherein:

FIG. 1 represents a two-frequency tone generator for the 2 x 1-out-of-4 code, and FIG. 2 also shows a two-frequency tone generator in which, however, the oscillating-circuit contacts are operated via a coordinate lever system.

FIG. 1 shows a standard-type feed-back tone generator with a transistor *Tr* in the output circuit of which two oscillating-circuits with the oscillating circuit inductors U*e*1 and U*e*2 and the oscillating circuit capacitors C1 and C2 are provided. The feed-back is achieved through the windings of the oscillating circuit transformer, inserted in the base circuit of the transistor.

The tone generator shown possesses a contact arrangement 1 to 16 which is tuned to a 2 x 1-out-of-4 code. Four different frequencies can be set with each oscillating-circuit. This is the case, when the capacitor C1 will be connected with one of the four tappings *a*, *b*, *c*, and *d* of the oscillating-circuit transformer U*e*1, and when the capacitor C2 is connected with one of the four tappings *e*, *f*, *g*, and *h* of the oscillating-circuit transformer U*e*2. All code signals are now selected in such a way that always one frequency of each group is included in the signal. All keys 1 to 16 therefore have contacts with the same reference existing in each oscillating circuit. When the key 1 is pressed the capacitor C1 is connected with the tapping *a* of the transformer U*e*1 and the capacitor C2 with the tapping *e* of the transformer U*e*2. Since, in both cases, the maximum inductance is effective in the oscillating circuit the lowest signal frequency of the group is produced when key 1 is pressed. When the key 16 is pressed the capacitor C1 is connected with the tapping *d* of the transformer U*e*1 and the capacitor C2 with the tapping *a* of the transformer U*e*2. Since in each oscillating-circuit the minimum inductance is now effective, the maximum signal frequency of the group-of-four is produced when key 16 is pressed. When pressing any of the remaining keys another combination of the four signal frequencies produced in the individual oscillating-circuits occur. When two or more keys are operated erroneously the break-contact chan of the change-over contacts assure that only one signal can be produced. Therefore only two signal frequencies are ever emitted. When the keys 8 and 9 are operated simultaneously the capacitor C1 is connected with the tapping *c* of one oscillating circuit via the contact 9 and in the other oscillating-circuit the contact 8 connects the capacitor C2 with the tapping *h*.

The contacts of the keys 8 and 9 further operated in both oscillating circuits do not influence the emission of the signal. It is thereby secured that no interfering single-frequency signal can be produced when two and more keys are unintendedly operated.

As may still be gathered from FIG. 1 the multi-frequency tone generator is connected with the supply voltage through a contact *tg* which is closed when any arbitrary key is operated. The operating sequence is thereby established in such a way that said contact closes only after the contacts in the oscillating-circuits have already closed. This precludes interfering signals even at different switching periods between the contacts of the various oscillating circuits.

The generator circuit, according to the invention, is not limited to the code shown on the drawing. When more oscillating circuits are arranged, other checkable codes are available. It should only be considered that always all contacts of an oscillating-circuit are switched in the manner shown in the arrangement according ot the invention.

FIG. 2 also shows a multi-frequency tone generator for a 2 x 1-out-of-4 code. The difference with the generator according to FIG. 1 is in the contact operation. The frequencies *f*1, *f*2, *f*3, and *f*4 are determined via the oscillating circuit U*e*1–C1, and the frequencies *f*5, *f*6, *f*7, and *f*8 of the multi-frequency tone generator are determined via the oscillating circuit U*e*2–C2. The keys operate a coordinate lever system with 4 x 4 levers or rods. Each rod is aligned to one of the frequencies *f*1 to *f*5 and *f*5 to *f*8, respectively. By the rods only the oscillating-circuit contacts marked with *f*1 to *f*8 are controlled. When operating an arbitrary key always one rod of each coordinate is actuated so that in each oscillating-circuit only one contact is actuated. The arrangement can be made as shown in FIG. 2. When key 5 is pressed the rods *f*2 and *f*5 must be actuated. The signal to be emitted therefore is composed of the signal frequencies *f*2 and *f*5. Since the contacts *f*1 to *f*4 and *f*5 to *f*8 are switched according to the invention here too, it is assured that at a simultaneous operation of two and more keys no single-frequency signal is emitted.

While the principles of the invention have been described above in connection with specific apparatus and applications, it is to be understood that this descripition is made only by way of example and not as a limitation on the scope of the invention.

What is claimed is:

1. A key-controlled single active element audiofrequency generator capable of simultaneously generating at least two distinct frequencies, said generator having first and second tank circuits, said first tank circuits comprising a first tapped inductance and a first capacitor, said second tank circuit comprising a second tapped inductance and a second capacitor, key contact means for simultaneously tuning said first and second tank circuit by simultaneously connecting said first and second capacitors to selected ones of the taps on said first and second tapped inductances respectively, said key contacts arranged in first and second changeover contact chains associated with said first and second tank circuit respectively, means for connecting the break contact sides of said changeover chains to said first and second capacitors, and means for connecting the make contact sides of said changeover contact chains with said taps to selectively tune said tank circuits.

2. The key-controlled generator of claim 1 wherein said contacts in said first chain are arranged in chronological rows, and wherein the contacts in said second chain are arranged in chronological columns with the contacts having the same number operated responsive to the same key.

3. The generator of claim 1 wherein a key has one of said contacts in each of said tank circuits.

4. The generator of claim 3 wherein a common contact is provided for initiating connection of the generator with the supply voltage responsive to the operation of any key.

5. The generator of claim 4, means for operating the common contact only after the changeover contacts have operated.

References Cited

UNITED STATES PATENTS

| | | | |
|---|---|---|---|
| 2,951,911 | 9/1960 | Van Lottum et al. | 179—84 |
| 2,957,952 | 10/1960 | Jaeger | 179—90.3 |
| 3,060,275 | 10/1962 | Meacham et al. | 179—84 |
| 3,064,084 | 11/1962 | Meacham | 179—84 |
| 3,140,358 | 7/1964 | Martens | 179—84 |
| 3,274,345 | 9/1966 | Ham et al. | 179—84 |

KATHLEEN H. CLAFFY, *Primary Examiner.*

H. ZELLER, *Assistant Examiner.*